United States Patent [19]

Sumner, Jr.

[11] Patent Number: 5,762,158
[45] Date of Patent: Jun. 9, 1998

[54] REMOTE MOTORCYCLE IDLE ADJUSTMENT CONTROL DEVICE

[76] Inventor: James D. Sumner, Jr., 131 Clair Hill Rd., Rochester Hill, Mich. 48308

[21] Appl. No.: 722,955

[22] Filed: Sep. 27, 1996

[51] Int. Cl.[6] .................................................. B62D 61/02
[52] U.S. Cl. ............................ 180/219; 123/339.13
[58] Field of Search ........................ 180/219; 123/339.1, 123/339.13

[56] References Cited

U.S. PATENT DOCUMENTS

| | | | |
|---|---|---|---|
| 3,650,155 | 3/1972 | McJones | 73/359 |
| 4,200,596 | 4/1980 | Iiyama et al. | 123/339.13 |
| 4,234,524 | 11/1980 | Arai | 261/41 |
| 4,271,095 | 6/1981 | Maeda | 261/41 |
| 4,474,152 | 10/1984 | Horiuchi et al. | 123/339.13 |
| 5,333,585 | 8/1994 | Kuroda | 123/339.11 |

*Primary Examiner*—Kevin Hurley
*Attorney, Agent, or Firm*—Richard L. Miller, P.E.

[57] ABSTRACT

A remote motorcycle idle adjustment control device attachable to a motorcycle and which allows the remote adjustment of a carburetor of the motorcycle by a rider while the rider is riding the motorcycle. The device includes a bracket, a slender, horizontally-oriented, rigid, and cylindrically-shaped shaft, a cylindrically-shaped and externally-knurled adjustment knob, and a carburetor adjustment screw. The bracket is attachable to an engine of the motorcycle at a position remote from the carburetor of the motorcycle. The slender, horizontally-oriented, rigid, and cylindrically-shaped shaft extends rotatively through the bracket. The cylindrically-shaped and externally-knurled adjustment knob is attached to, and for rotation with, the slender, horizontally-oriented, rigid, and cylindrically-shaped shaft. The elongated, slender, and flexible cable is attached to, and for rotation with, the slender, horizontally-oriented, rigid, and cylindrically-shaped shaft. And, the carburetor adjustment screw has a head attached to, and for rotation with, the elongated, slender, and flexible cable, and a threaded portion that threadably engages, for adjustment of, the carburetor of the motorcycle, so that when the cylindrically-shaped and externally-knurled adjustment knob is rotated by the rider from the position remote from the carburetor of the motorcycle while the rider is riding the motorcycle, the slender, horizontally-oriented, rigid, and cylindrically-shaped shaft is caused to rotate in the bracket which in turn causes the elongated, slender, and flexible cable to rotate which in turn causes the carburetor adjustment screw to rotate in the carburetor and adjust the carburetor of the motorcycle while the rider is riding the motorcycle allowing for a more accurate adjustment.

34 Claims, 2 Drawing Sheets

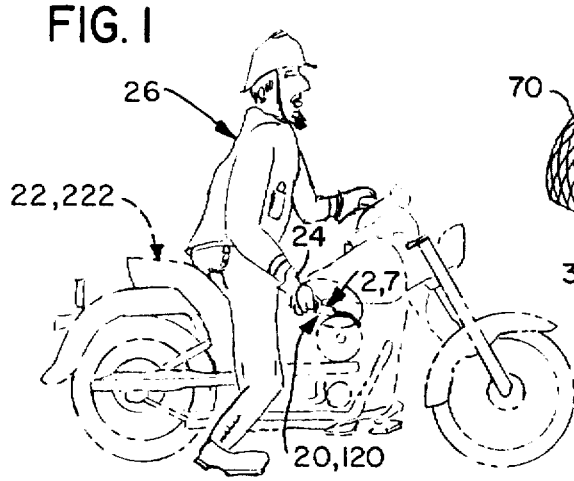
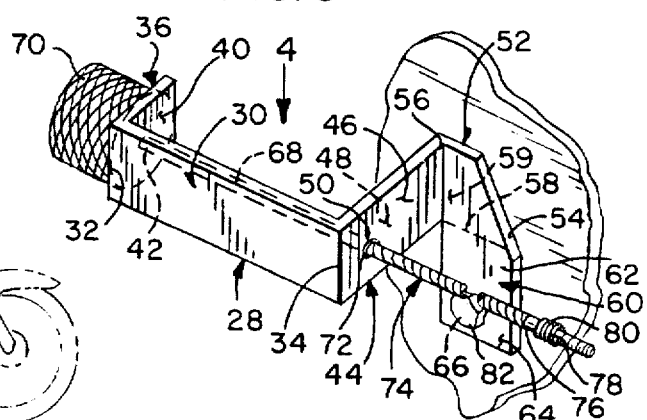
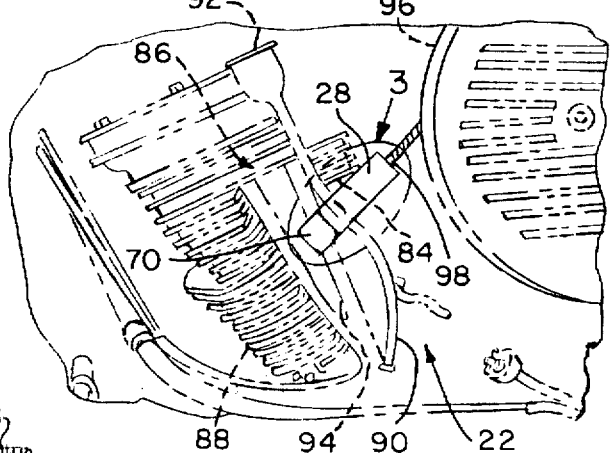
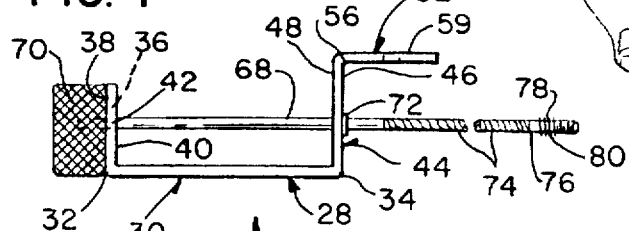
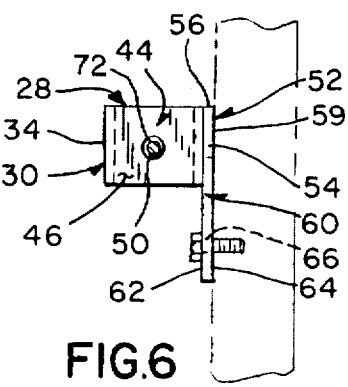

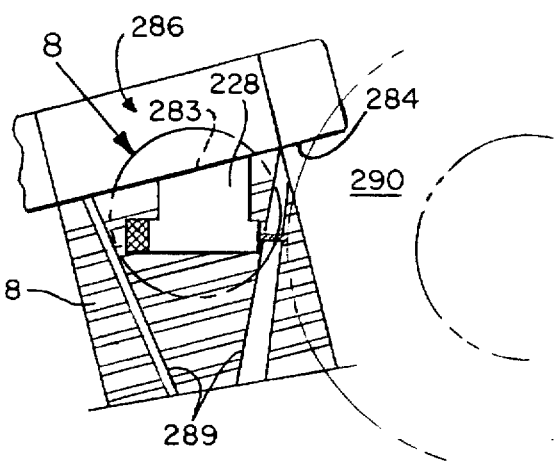
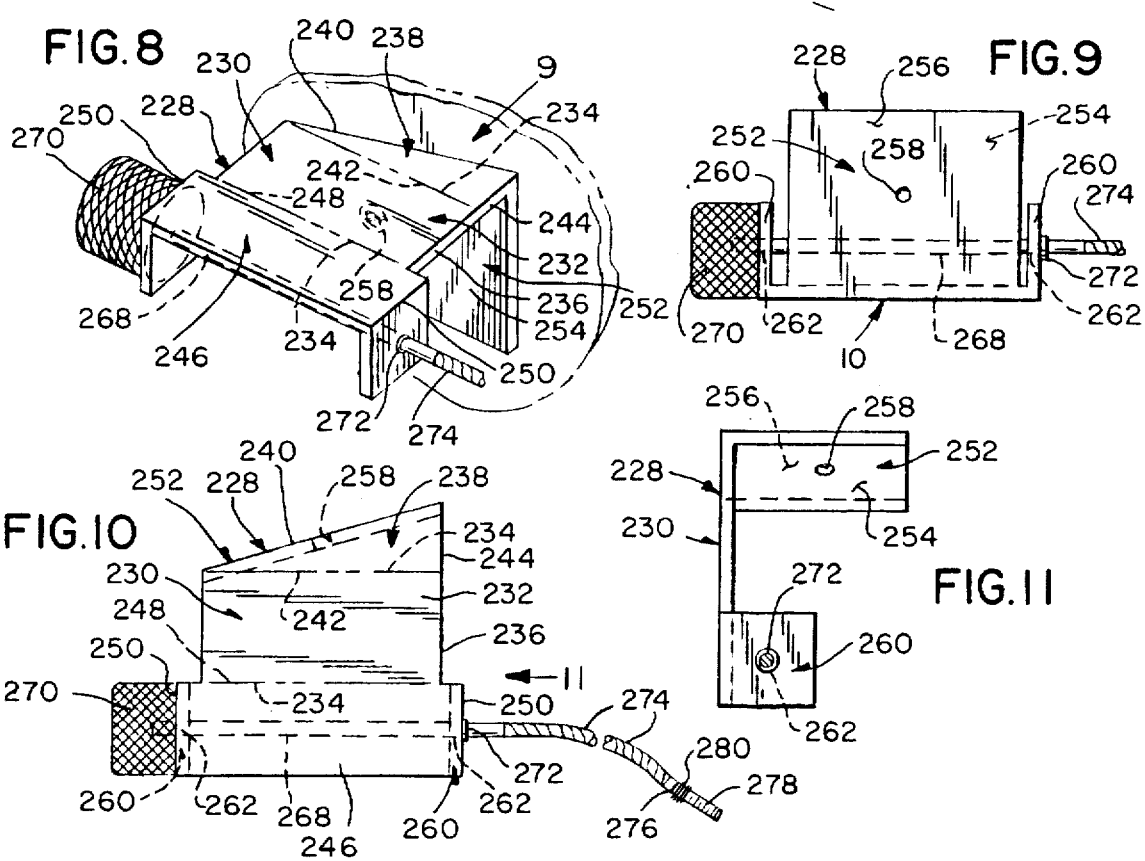

REMOTE MOTORCYCLE IDLE ADJUSTMENT CONTROL DEVICE

BACKGROUND OF THE INVENTION

The present invention relates to a motorcycle idle adjustment control device. More particularly, the present invention relates to a remote motorcycle idle adjustment control device that is attachable to a motorcycle and which allows the remote adjustment of a carburetor of the motorcycle by a rider while the rider is riding the motorcycle wherein the device includes a bracket, a slender, horizontally-oriented, rigid, and cylindrically-shaped shaft, a cylindrically-shaped and externally-knurled adjustment knob, and a carburetor adjustment screw.

It has well been recognized that carburetor settings have significant influences on pollutant emissions in exhaust gas. If the carburetor settings are changed in use, there will be a high possibility that the pollutant emissions are increased beyond allowable limits.

As a result, however, of the position of the idle control screw on the carburetor of a motorcycle, adjustment is not an easy task. The motorcycle must be stopped and supported on the kick stand before the idle screw can even be accessed. Once the idle screw is accessed, a screw driver must be used to rotate the idle screw. If the motorcycle requires frequent idle adjustments, it must be repeatedly stopped and supported each time the idle is to be adjusted. Not a favorable task.

Numerous innovations for idle adjusters have been provided in the prior art that will be described. Even though these innovations may be suitable for the specific individual purposes to which they address, however, they differ from the present invention in that they do not teach a remote motorcycle idle adjustment control device that is attachable to a motorcycle and which allows the remote adjustment of a carburetor of the motorcycle by a rider while the rider is riding the motorcycle wherein the device includes a bracket, a slender, horizontally-oriented, rigid, and cylindrically-shaped shaft, a cylindrically-shaped and externally-knurled adjustment knob, and a carburetor adjustment screw.

FOR EXAMPLE, U.S. Pat. No. 3,650,155 to McJones teaches an idle adjusting tool that has a body adapted for mounting on a fuel-air mixer with a bore of the body opening into a fuel passage of the mixer. A spring biases a screwdriver blade, received in the bore, away from an idle adjusting screw of the mixer. Upon displacing the screwdriver blade against the force of the spring, it is possible to engage the idle adjusting screw. Gas pressure communication between the fuel passage and a pressure gauge connected to the tool exists through the bore.

ANOTHER EXAMPLE, U.S. Pat. No. 4,234,524 to Arai teaches a mixture adjusting screw in a carburetor for regulating the fuel flux during engine idling. The end needle portion of the screw is located in the idle port of the carburetor and a spring is loaded around the rod portion of the screw to hold the screw in position after adjustment so as to maintain its proper adjustment. The screw head is covered by a plug and it is specifically shaped to inhibit easy access of the user to the screw for adjustment purposes. The air and fuel mixture formed in the low-load fuel system in the carburetor is well stirred due to the presence of the spring which is exposed to a fuel passage and is formed into an emulsion flow, allowing stabilized rotation of the engine during idling and high performance thereof in normal running.

STILL ANOTHER EXAMPLE, U.S. Pat. No. 4,271,095 to Maeda teaches a carburetor for an internal combustion engine that has an idle adjust screw. A cover is provided for encompassing the idle adjust screw so as to prevent any readjustment of the idle adjust screw by an operator. The cover is not removable once the carburetor is mounted on the intake pipe, so that carburetor settings can be maintained. The cover may be formed with a slot of special configuration, so that adjustment may be made only with a specially designed tool YET ANOTHER EXAMPLE, U.S. Pat. No. 4,474,152 to Horiuchi et al. teaches an idle adjusting device for an engine having an air intake passage and a throttle valve disposed in the air intake passage. An auxiliary passage communicated with the air intake passage in such a manner as to bypass the throttle valve. A first member protrudes into the auxiliary passage so as to locally reduce the cross-sectional area of the auxiliary passage. A second member movably protrudes into the auxiliary passage at a position relatively near the first member, so that the first and second member will cooperate to adjust the effective cross-sectional area of the auxiliary passage in accordance with movement of the second member.

FINALLY, STILL YET ANOTHER EXAMPLE, U.S. Pat. No. 5,333,585 to Kuroda teaches an apparatus for controlling idle revolutions of an engine. The apparatus comprises a controlling member to control an idle revolution changing member so as to adjust the idle revolutions detected by the engine revolution detector to a predetermined number of idle revolutions. The controlling member fixes the idle revolution changing member to a predetermined condition during misfiring of the engine detected by a misfire detecting member.

It is apparent that numerous innovations for idle adjusters have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a remote motorcycle idle adjustment control device that avoids the disadvantages of the prior art.

ANOTHER OBJECT of the present invention is to provide a remote motorcycle idle adjustment control device that is simple and inexpensive to manufacture.

STILL ANOTHER OBJECT of the present invention is to provide a remote motorcycle idle adjustment control device that is simple to use.

YET ANOTHER OBJECT of the present invention is to provide a remote motorcycle idle adjustment control device that eliminates the need for a screw driver to adjust the idle on a Harley-Davidson(tm) motorcycle.

STILL YET ANOTHER OBJECT of the present invention is to provide a remote motorcycle idle adjustment control device that allows idle adjustments while riding the motorcycle, at a stop light, for example, without having to physically get off the motorcycle and look for a screw driver.

YET STILL ANOTHER OBJECT of the present invention is to provide a remote motorcycle idle adjustment control device that allows for an easy means of making a specified idle speed.

STILL YET ANOTHER OBJECT of the present invention is to provide a remote motorcycle idle adjustment control device that allows for an easy means of making engine timing adjustments.

YET STILL ANOTHER OBJECT of the present invention is to provide a remote motorcycle idle adjustment control device that allows for an easy means of verifying proper engine timing.

BRIEFLY STATED, STILL YET ANOTHER OBJECT of the present invention is to provide a remote motorcycle idle adjustment control device that is attachable to a motorcycle and which allows the remote adjustment of a carburetor of the motorcycle by a rider while the rider is riding the motorcycle wherein the device includes a bracket, a slender, horizontally-oriented, rigid, and cylindrically-shaped shaft, a cylindrically-shaped and externally-knurled adjustment knob, and a carburetor adjustment screw.

YET STILL ANOTHER OBJECT of the present invention is to provide a remote motorcycle idle adjustment control device wherein the bracket is attachable to an engine of the motorcycle at a position remote from the carburetor of the motorcycle wherein the position is either at an existing hole in, and in abutment against, a rear cylinder of the engine of the motorcycle and straddling and clearing cooling fins of the rear cylinder of the engine of the motorcycle and straddling and clearing a cable of an oil pressure gauge of the engine of the motorcycle and clearing an air cleaner assembly of the engine of the motorcycle and clearing push rod tubes of the engine of the motorcycle, so that said bracket conforms to the configuration of the engine of the motorcycle or at an existing hole in, and in abutment against, a bottom of an obliquely-oriented cylinder head of the rear cylinder of the engine of the motorcycle and nested between and clearing the push rod tubes of the rear cylinder of the engine of the motorcycle and clearing the engine air cleaner assembly of the engine of the motorcycle and clearing the rear cylinder of the engine of the motorcycle, so that said bracket conforms to the configuration of the engine of the motorcycle.

STILL YET ANOTHER OBJECT of the present invention is to provide a remote motorcycle idle adjustment control device wherein the slender, horizontally-oriented, rigid, and cylindrically-shaped shaft extends rotatively through the bracket and has a proximal end and a distal end.

YET STILL ANOTHER OBJECT of the present invention is to provide a remote motorcycle idle adjustment control device wherein the cylindrically-shaped and externally-knurled adjustment knob has a diameter and is attached to, for rotation with, the proximal end of the slender, horizontally-oriented, rigid, and cylindrically-shaped shaft.

STILL YET ANOTHER OBJECT of the present invention is to provide a remote motorcycle idle adjustment control device wherein the elongated, slender, and flexible cable has a length and is attached at a proximal end thereof collinearly to, and for rotation with, the distal end of the slender horizontally-oriented, rigid, and cylindrically-shaped shaft and has a distal end, so that required bends to route the elongated, slender, and flexible cable to the carburetor of the motorcycle can be achieved.

YET STILL ANOTHER OBJECT of the present invention is to provide a remote motorcycle idle adjustment control device wherein the carburetor adjustment screw has a length, a head attached to, for rotation with, the distal end of the elongated, slender, and flexible cable, and a threaded portion that extends collinearly with the distal end of the elongated, slender, and flexible cable and threadably engages, for adjustment of, the carburetor of the motorcycle, so that when the cylindrically-shaped and externally-knurled adjustment knob is rotated by the rider from the position remote from the carburetor of the motorcycle while the rider is riding the motorcycle, the slender, horizontally-oriented, rigid, and cylindrically-shaped shaft is caused to rotate in the bracket which in turn causes the elongated, slender, and flexible cable to rotate which in turn causes the carburetor adjustment screw to rotate in the carburetor and adjust the carburetor of the motorcycle while the rider is riding the motorcycle allowing for a more accurate adjustment.

STILL YET ANOTHER OBJECT of the present invention is to provide a remote motorcycle idle adjustment control device wherein said bracket is made from 0.10" metal.

YET STILL ANOTHER OBJECT of the present invention is to provide a remote motorcycle idle adjustment control device wherein the diameter of the cylindrically-shaped and externally-knurled adjustment knob is 0.4".

STILL YET ANOTHER OBJECT of the present invention is to provide a remote motorcycle idle adjustment control device wherein the bracket has a flat, vertically-oriented, and rectangular-shaped front portion with a height, a length, a short and vertically-oriented rear edge, and a short and vertically-oriented forward edge that is parallel to, and disposed in front of, the short and vertically-oriented rear edge of the flat, vertically-oriented, and rectangular-shaped front portion of the bracket.

YET STILL ANOTHER OBJECT of the present invention is to provide a remote motorcycle idle adjustment control device wherein the length of the flat, vertically-oriented, and rectangular-shaped front portion of the bracket is 1", and the height of the flat, vertically-oriented, and rectangular-shaped front portion of the bracket is 0.5".

STILL YET ANOTHER OBJECT of the present invention is to provide a remote motorcycle idle adjustment control device wherein the bracket further has a flat, vertically-oriented, and square-shaped rear side portion that has a height equal to the height of the flat, vertically-oriented, and rectangular-shaped front portion of the bracket, and whose upper and lower edges are coplanar with respective upper and lower edges of the flat, vertically-oriented, and rectangular-shaped front portion of the bracket.

YET STILL ANOTHER OBJECT of the present invention is to provide a remote motorcycle idle adjustment control device wherein the flat, vertically-oriented, and square-shaped rear side portion of the bracket is integral with, and extends perpendicularly-rearwardly from, the short and vertically-oriented rear edge of the flat, vertically-oriented, and rectangular-shaped front portion of the bracket.

STILL YET ANOTHER OBJECT of the present invention is to provide a remote motorcycle idle adjustment control device wherein the flat, vertically-oriented, and square-shaped rear side portion of the bracket further has a flat and square-shaped outer surface with a center and a flat and square-shaped inner surface that is parallel to the flat and square-shaped outer surface of the flat, vertically-oriented, and square-shaped rear side portion of the bracket and has a center.

YET STILL ANOTHER OBJECT of the present invention is to provide a remote motorcycle idle adjustment control device wherein the flat, vertically-oriented, and square-shaped rear side portion of the bracket further has a horizontally-oriented throughbore that extends horizontally therethrough, from the center of the flat and square-shaped outer surface of the flat, vertically-oriented, and square-shaped rear side portion of the bracket to the center of the flat and square-shaped inner surface of the flat, vertically-oriented, and square-shaped rear side portion of the bracket.

STILL YET ANOTHER OBJECT of the present invention is to provide a remote motorcycle idle adjustment control device wherein the bracket further has a flat, vertically-oriented, and rectangular-shaped front side portion with a length, a height equal to the height of the flat, vertically-oriented, and rectangular-shaped front portion of the bracket, and whose upper and lower edges are coplanar with the respective upper and lower edges of the flat, vertically-oriented, and rectangular-shaped front portion of the bracket.

YET STILL ANOTHER OBJECT of the present invention is to provide a remote motorcycle idle adjustment control device wherein the flat, vertically-oriented, and rectangular-shaped front side portion of the bracket is integral with, and extends at a short and vertically-oriented front edge thereof, perpendicularly-rearwardly from the short and vertically-oriented front edge of the flat, vertically-oriented, and rectangular-shaped front portion of the bracket.

STILL YET ANOTHER OBJECT of the present invention is to provide a remote motorcycle idle adjustment control device wherein the flat, vertically-oriented, and rectangular-shaped front side portion of the bracket further has a flat and rectangular-shaped outer surface with a center and a flat and rectangular-shaped inner surface that is parallel to the flat and rectangular-shaped outer surface of the flat, vertically-oriented, and rectangular-shaped front side portion of the bracket and has a center.

YET STILL ANOTHER OBJECT of the present invention is to provide a remote motorcycle idle adjustment control device wherein the flat, vertically-oriented, and rectangular-shaped front side portion of the bracket further has a horizontally-oriented throughbore that extends horizontally therethrough, from the center of the flat and rectangular-shaped outer surface of the flat, vertically-oriented, and rectangular-shaped front side portion of the bracket to the center of the flat and rectangular-shaped inner surface of the flat, vertically-oriented, and rectangular-shaped front side portion of the bracket, and is in alignment with the horizontally-oriented throughbore in the flat, vertically-oriented, and square-shaped rear side portion of the bracket.

STILL YET ANOTHER OBJECT of the present invention is to provide a remote motorcycle idle adjustment control device wherein the flat, vertically-oriented, and rectangular-shaped front side portion of the bracket is disposed in front of, parallel to, and has a length greater than, the flat, vertically-oriented, and square-shaped rear portion of the bracket, so that an offset is formed that provides clearance for the cylindrically-shaped and externally-knurled adjustment knob from the push rod tubes of the engine of the motorcycle for easy rotation thereof.

YET STILL ANOTHER OBJECT of the present invention is to provide a remote motorcycle idle adjustment control device wherein the flat, vertically-oriented, and square-shaped rear side portion of the bracket, the flat, vertically-oriented, and rectangular-shaped front portion of the bracket, and the flat, vertically-oriented, and rectangular-shaped front side portion of the bracket define a space, so that clearance is provided for the cooling fins of the rear cylinder of the engine of the motorcycle and for the cable of the oil pressure gauge of the engine of the motorcycle.

STILL YET ANOTHER OBJECT of the present invention is to provide a remote motorcycle idle adjustment control device wherein the length of the flat, vertically-oriented, and rectangular-shaped front side portion of the bracket is 1".

YET STILL ANOTHER OBJECT of the present invention is to provide a remote motorcycle idle adjustment control device wherein the bracket further has a flat, vertically-oriented, and substantially right-triangular-shaped upper mounting portion with a height, a hypothenuse, a vertical side, an imaginary horizontal base that is perpendicular to the vertical side of the flat, vertically-oriented, and substantially right-triangular-shaped upper mounting portion of the bracket, and an inner surface.

STILL YET ANOTHER OBJECT of the present invention is to provide a remote motorcycle idle adjustment control device wherein the flat, vertically-oriented, and substantially right-triangular-shaped upper mounting portion of the bracket is integral with, and extends perpendicularly-forwardly from, the bracket flat, vertically-oriented, and rectangular-shaped front side portion of the bracket, in a direction opposite and parallel to the flat, vertically-oriented, and rectangular-shaped front portion of the bracket, and with the vertical side of the flat, vertically-oriented, and substantially right-triangular-shaped upper mounting portion of the bracket being coincident with a short and vertically-oriented rear edge of the flat, vertically-oriented, and rectangular-shaped front side portion of the bracket, so that an offset is formed that provides clearance for the air cleaner assembly of the motorcycle.

YET STILL ANOTHER OBJECT of the present invention is to provide a remote motorcycle idle adjustment control device wherein the imaginary horizontal base of the flat, vertically-oriented, and substantially right-triangular-shaped upper mounting portion of the bracket is 0.75" long.

STILL YET ANOTHER OBJECT of the present invention is to provide a remote motorcycle idle adjustment control device wherein the bracket further has a flat, vertically-oriented, and square-shaped lower mounting portion that has a height, is integral and coplanar with, and extends vertically downwardly from, the flat, vertically-oriented, and substantially right-triangular-shaped upper mounting portion of the bracket, with an upper horizontally-oriented side thereof being coincident with, and of equal width as, the imaginary horizontal base of the flat, vertically-oriented, and substantially right-triangular-shaped upper mounting portion of the bracket.

YET STILL ANOTHER OBJECT of the present invention is to provide a remote motorcycle idle adjustment control device wherein the flat, vertically-oriented, and square-shaped lower mounting portion of the bracket has a flat and square-shaped outer surface with a center and a flat and square-shaped inner surface which is parallel to the flat and square-shaped outer surface of the flat, vertically-oriented, and square-shaped lower mounting portion of the bracket and has a center.

STILL YET ANOTHER OBJECT of the present invention is to provide a remote motorcycle idle adjustment control device wherein the flat, vertically-oriented, and square-shaped lower mounting portion of the bracket further has a horizontally-oriented throughbore that extends horizontally therethrough, from the center of the flat and square-shaped outer surface of the flat, vertically-oriented, and square-shaped lower mounting portion of the bracket to the center of the flat and square-shaped inner surface of the flat, vertically-oriented, and square-shaped lower mounting portion of the bracket, and is alignable with the existing hole in the rear cylinder of the engine of the motorcycle, so that easy mounting of the bracket to the rear cylinder of the engine of the motorcycle is provided.

YET STILL ANOTHER OBJECT of the present invention is to provide a remote motorcycle idle adjustment control device wherein the height of the flat, vertically-oriented, and substantially right-triangular-shaped upper mounting portion of the bracket plus the height of the flat, vertically-oriented, and square-shaped lower mounting portion of the bracket is 1.5".

STILL YET ANOTHER OBJECT of the present invention is to provide a remote motorcycle idle adjustment control device wherein the slender, horizontally-oriented, rigid, and cylindrically-shaped shaft extends at the proximal end thereof rotatively through the horizontally-oriented throughbore in the flat, vertically-oriented, and square-shaped rear side portion of the bracket to a distance slightly past the flat, vertically-oriented, and square-shaped rear side portion of the bracket, and extends at the distal end thereof rotatively through the horizontally-oriented throughbore in the flat, vertically-oriented, and rectangular-shaped front side portion of the bracket to a distance slightly past the flat, vertically-oriented, and rectangular-shaped front side portion of the bracket, and is parallel to the flat, vertically-oriented, and rectangular-shaped front portion of the bracket.

YET STILL ANOTHER OBJECT of the present invention is to provide a remote motorcycle idle adjustment control device wherein the cylindrically-shaped and externally-knurled adjustment knob abuts rotatively against, without extending past edges of, the flat and square-shaped outer surface of the flat, vertically-oriented, and square-shaped rear side portion of the bracket.

STILL YET ANOTHER OBJECT of the present invention is to provide a remote motorcycle idle adjustment control device that further includes a snap ring that encircles the distal end of the slender, horizontally-oriented, rigid, and cylindrically-shaped shaft and is disposed at the horizontally-oriented throughbore in the flat, vertically-oriented, and rectangular-shaped front side portion of the bracket, so that the slender, horizontally-oriented, rigid, and cylindrically-shaped shaft is maintained in place.

YET STILL ANOTHER OBJECT of the present invention is to provide a remote motorcycle idle adjustment control device wherein the elongated, slender, and flexible cable is covered with heat shrink tube, so that chafing between the elongated, slender, and flexible cable and the air cleaner assembly of the engine of the motorcycle is prevented while aesthetics are improved.

STILL YET ANOTHER OBJECT of the present invention is to provide a remote motorcycle idle adjustment control device wherein the proximal end of the elongated, slender, and flexible cable is brazed to the distal end of the slender, horizontally-oriented, rigid, and cylindrically-shaped shaft.

YET STILL ANOTHER OBJECT of the present invention is to provide a remote motorcycle idle adjustment control device wherein the head of the carburetor adjustment screw is brazed to the distal end of the elongated, slender, and flexible cable.

STILL YET ANOTHER OBJECT of the present invention is to provide a remote motorcycle idle adjustment control device wherein the length of the elongated, slender, and flexible cable plus the length of the carburetor adjustment screw is approximately 6".

YET STILL ANOTHER OBJECT of the present invention is to provide a remote motorcycle idle adjustment control device that further includes a coil spring that encircles the threaded portion of the carburetor adjustment screw and abuts against the head thereof, so that the adjustment screw is maintained in place in the carburetor once adjustment has been made to the carburetor.

STILL YET ANOTHER OBJECT of the present invention is to provide a remote motorcycle idle adjustment control device that further includes a mounting screw that passes through the horizontally-oriented throughbore in the flat, vertically-oriented, and square-shaped lower mounting portion of the bracket and into the existing hole in the rear cylinder of the engine of the motorcycle, with the flat and square-shaped inner surface of the flat, vertically-oriented, and square-shaped lower mounting portion of the bracket abutting against the rear cylinder of the engine of the motorcycle.

YET STILL ANOTHER OBJECT of the present invention is to provide a remote motorcycle idle adjustment control device wherein the bracket has a flat, vertically-oriented front portion with a flat and rectangular-shaped intermediate part that has a pair of spaced-apart and horizontally-oriented imaginary long sides, and a front vertical edge.

STILL YET ANOTHER OBJECT of the present invention is to provide a remote motorcycle idle adjustment control device wherein the flat, vertically-oriented front portion of the bracket further has a flat, vertically-oriented, and right-triangular-shaped upper portion with a hypothenuse, a horizontally-oriented imaginary base, and a vertically-oriented side that is perpendicular to the horizontally-oriented base of the flat, vertically-oriented, and right-triangular-shaped upper portion of the flat, vertically-oriented front portion of the bracket.

YET STILL ANOTHER OBJECT of the present invention is to provide a remote motorcycle idle adjustment control device wherein the flat, vertically-oriented, and right-triangular-shaped upper portion of the flat, vertically-oriented front portion of the bracket extends coplanarly upwardly from, and is integral with, the flat and rectangular-shaped intermediate part of the flat, vertically-oriented front portion of the bracket, with the horizontally-oriented imaginary base of the flat, vertically-oriented, and right-triangular-shaped upper portion of the flat, vertically-oriented front portion of the bracket being coincident with, and of equal length as, an uppermost long side of the pair of spaced-apart and horizontally-oriented imaginary long sides of the flat and rectangular-shaped intermediate part of the flat, vertically-oriented front portion of the bracket, and with the front vertical edge of the flat and rectangular-shaped intermediate part of the flat, vertically-oriented front portion of the bracket being collinear with the vertically-oriented side of the flat, vertically-oriented, and right-triangular-shaped upper portion of the flat, vertically-oriented front portion of the bracket.

STILL YET ANOTHER OBJECT of the present invention is to provide a remote motorcycle idle adjustment control device wherein the horizontally-oriented imaginary base of the flat, vertically-oriented, and right-triangular-shaped upper portion of the flat, vertically-oriented front portion of the bracket is 0.9" long.

YET STILL ANOTHER OBJECT of the present invention is to provide a remote motorcycle idle adjustment control device wherein the flat, vertically-oriented front portion of the bracket further has a vertically-oriented, and rectangular-shaped lower portion with a horizontally-oriented imaginary upper long side that has a length, and a pair of vertically-oriented short sides.

STILL YET ANOTHER OBJECT of the present invention is to provide a remote motorcycle idle adjustment control device wherein the flat, vertically-oriented, and rectangular-shaped lower portion of the flat, vertically-oriented front portion of the bracket extends coplanarly downwardly from, and is integral with, the flat and rectangular-shaped intermediate part of the flat, vertically-oriented front portion of the bracket, with the horizontally-oriented imaginary upper long side of the flat, vertically-oriented, and rectangular-shaped lower portion of the flat, vertically-oriented front portion of the bracket being coincident with, and extending slightly past both ends of, a lowermost long side of the pair of spaced-apart and horizontally-oriented imaginary long sides of the flat and rectangular-shaped intermediate part of the flat, vertically-oriented front portion of the bracket.

YET STILL ANOTHER OBJECT of the present invention is to provide a remote motorcycle idle adjustment control device wherein the length of the horizontally-oriented imaginary upper long side of the vertically-oriented, and rectangular-shaped lower portion of the flat, vertically-oriented front portion of the bracket is 1".

STILL YET ANOTHER OBJECT of the present invention is to provide a remote motorcycle idle adjustment control device wherein the bracket further has an obliquely-oriented and square-shaped top portion with a width, a flat and square-shaped inner surface that has a center, and a flat and square-shaped outer surface that has a center and is parallel to the flat and square-shaped inner surface of the obliquely-oriented and square-shaped top portion of the bracket.

YET STILL ANOTHER OBJECT of the present invention is to provide a remote motorcycle idle adjustment control device wherein the obliquely-oriented and square-shaped top portion of the bracket further has a substantially vertically-oriented throughbore that extends substantially vertically therethrough, from the center of the flat and square-shaped inner surface of the obliquely-oriented and square-shaped top portion of the bracket to the center of the flat and square-shaped outer surface of the obliquely-oriented and square-shaped top portion of the bracket, and is alignable with the existing hole in the obliquely-oriented bottom of the cylinder head of the rear cylinder of the engine of the motorcycle, so that easy mounting of the bracket to the obliquely-oriented bottom of the cylinder head of the rear cylinder of the engine of the motorcycle is provided.

STILL YET ANOTHER OBJECT of the present invention is to provide a remote motorcycle idle adjustment control device wherein the obliquely-oriented and square-shaped top portion of the bracket extends perpendicularly rearwardly from, and is integral with, the flat, vertically-oriented, and right-triangular-shaped upper portion of the flat, vertically-oriented front portion of the bracket, with a side of the obliquely-oriented and square-shaped top portion of the bracket being coincident with, and of equal length as, the hypothenuse of the flat, vertically-oriented, and right-triangular-shaped upper portion of the flat, vertically-oriented front portion of the bracket, and with its orientation being oblique to that of the flat, vertically-oriented front portion of the bracket.

YET STILL ANOTHER OBJECT of the present invention is to provide a remote motorcycle idle adjustment control device wherein the width of the obliquely-oriented and square-shaped top portion of the bracket is 1.5".

STILL YET ANOTHER OBJECT of the present invention is to provide a remote motorcycle idle adjustment control device wherein the bracket further has a pair of flat, parallel, spaced-apart, vertically-oriented, and square-shaped side portions.

YET STILL ANOTHER OBJECT of the present invention is to provide a remote motorcycle idle adjustment control device wherein each side portion of the pair of flat, parallel, spaced-apart, vertically-oriented, and square-shaped side portions of the bracket extends perpendicularly rearwardly from, is integral with, and has same height as, a respective short side of the pair of vertically-oriented short sides of the flat, vertically-oriented, and rectangular-shaped lower portion of the flat, vertically-oriented front portion of the bracket.

STILL YET ANOTHER OBJECT of the present invention is to provide a remote motorcycle idle adjustment control device wherein the pair of flat, parallel, spaced-apart, vertically-oriented, and square-shaped side portions of the bracket extend perpendicularly rearwardly from the pair of vertically-oriented short sides of the flat, vertically-oriented, and rectangular-shaped lower portion of the flat, vertically-oriented front portion of the bracket, to a distance less than that of the obliquely-oriented and square-shaped top portion of the bracket, so that clearance is provided for the bracket from the rear cylinder of the engine of the motorcycle while allowing the cylindrically-shaped and externally-knurled adjustment knob to clear a rearmost push rod tube of the push rod tubes of the rear cylinder of the engine of the motorcycle for easy accessibility and rotation thereof.

YET STILL ANOTHER OBJECT of the present invention is to provide a remote motorcycle idle adjustment control device wherein each side portion of the pair of flat, parallel, spaced-apart, vertically-oriented, and square-shaped side portions of the bracket has a center and a horizontally-oriented throughbore that extends horizontally through the center thereof.

STILL YET ANOTHER OBJECT of the present invention is to provide a remote motorcycle idle adjustment control device wherein the slender, horizontally-oriented, rigid, and cylindrically-shaped shaft extends rotatively through the horizontally-oriented throughbore in each side portion of the pair of flat, parallel, spaced-apart, vertically-oriented, and square-shaped side portions of the bracket to a distance slightly past each side portion of the pair of flat, parallel, spaced-apart, vertically-oriented, and square-shaped side portions of the bracket, and is parallel to the flat, vertically-oriented front portion of the bracket.

YET STILL ANOTHER OBJECT of the present invention is to provide a remote motorcycle idle adjustment control device wherein the cylindrically-shaped and externally-knurled adjustment knob abuts rotatively against, without extending past edges of, an outer surface of a rearmost side portion of the pair of flat, parallel, spaced-apart, vertically-oriented, and square-shaped side portions of the bracket.

STILL YET ANOTHER OBJECT of the present invention is to provide a remote motorcycle idle adjustment control device that further includes a snap ring that encircles the distal end of the slender, horizontally-oriented, rigid, and cylindrically-shaped shaft and is disposed at the horizontally-oriented throughbore in a forwardmost side portion of the pair of flat, parallel, spaced-apart, vertically-oriented, and square-shaped side portions of the bracket, so that the slender, horizontally-oriented, rigid, and cylindrically-shaped shaft is maintained in place.

FINALLY, YET STILL ANOTHER OBJECT of the present invention is to provide a remote motorcycle idle adjustment control device that further includes a mounting screw that passes through the substantially vertically-oriented throughbore in the obliquely-oriented and square-shaped top portion of the bracket and into the existing hole in the obliquely-oriented bottom of the cylinder head of the rear cylinder of the engine of the motorcycle, with the flat and square-shaped outer surface of the obliquely-oriented and square-shaped top portion of the bracket abutting against the obliquely-oriented bottom of the cylinder head of the rear cylinder of the engine of the motorcycle, so that the oblique orientation of the obliquely-oriented and square-shaped top portion of the bracket relative to the flat, vertically-oriented front portion of the bracket allows the slender, horizontally-oriented, rigid, and cylindrically-shaped shaft to remain horizontal and thereby allowing the cylindrically-shaped and externally-knurled adjustment knob to be easily accessible for rotation thereof when the bracket is mounted to the obliquely-oriented bottom of the cylinder head of the rear cylinder of the engine of the motorcycle.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of the present invention installed on a typical Harley-Davidson(tm) motorcycle and being utilized to adjust the idle thereof;

FIG. 2 is an enlarged diagrammatic perspective view of the area generally enclosed by the dotted ellipse identified by arrow 2 in FIG. 1 of a first embodiment of the present invention for utilization on a 1985 to 1996 Harley-Davidson (tm) motorcycle;

FIG. 3 is an enlarged diagrammatic perspective view of the area generally enclosed by the dotted ellipse identified by arrow 3 in FIG. 2;

FIG. 4 is a diagrammatic top plan view taken generally in the direction of arrow 4 in FIG. 3;

FIG. 5 is a diagrammatic front elevational view taken generally in the direction of arrow 5 in FIG. 4;

FIG. 6 is a diagrammatic end elevational view taken generally in the direction of arrow 6 in FIG. 5;

FIG. 7 is an enlarged diagrammatic perspective view of the area generally enclosed by the dotted ellipse identified by arrow 7 in FIG. 1 of a second embodiment of the present invention for utilization on a 1965 to 1984 Harley-Davidson (tm) motorcycle;

FIG. 8 is an enlarged diagrammatic perspective view of the area generally enclosed by the dotted ellipse identified by arrow 8 in FIG. 7;

FIG. 9 is a diagrammatic top plan view taken generally in the direction of arrow 9 in FIG. 8;

FIG. 10 is a diagrammatic front elevational view taken generally in the direction of arrow 10 in FIG. 9; and FIG. 11 is a diagrammatic end elevational view taken generally in the direction of arrow 11 in FIG. 10.

LIST OF REFERENCE NUMERALS UTILIZED IN THE DRAWING

1985 to 1996 Harley-Davidson(tm) Motorcycle Embodiment 20 remote motorcycle idle adjustment control device of the present invention 22 1985 to 1996 Harley-Davidson(tm) motorcycle
24 motorcycle rider hand
26 motorcycle rider
28 bracket
30 bracket flat, vertically-oriented, and rectangular-shaped front portion
32 bracket front portion short and vertically-oriented rear edge
34 bracket front portion short and vertically-oriented forward edge
36 bracket flat, vertically-oriented, and square-shaped rear side portion
38 bracket rear portion flat and square-shaped outer surface
40 bracket rear portion flat and square-shaped inner surface
42 bracket rear portion horizontally-oriented throughbore
44 bracket flat, vertically-oriented, and rectangular-shaped front side portion
46 bracket front portion flat and rectangular-shaped outer surface
48 bracket front portion flat and rectangular-shaped inner surface
50 bracket front portion horizontally-oriented throughbore
52 bracket flat, vertically-oriented, and substantially right-triangular-shaped upper mounting portion
54 bracket upper mounting portion hypothenuse
56 bracket upper mounting portion vertical side
58 bracket upper mounting portion imaginary horizontal base
59 bracket upper mounting portion inner surface
60 bracket flat, vertically-oriented, and square-shaped lower mounting portion
62 bracket lower mounting portion flat and square-shaped outer surface
64 bracket lower mounting portion flat and square-shaped inner surface
66 bracket lower mounting portion horizontally-oriented throughbore
68 slender, horizontally-oriented, rigid, and cylindrically-shaped shaft
70 cylindrically-shaped and externally-knurled adjustment knob
72 snap ring
74 elongated, slender, and flexible cable
78 carburetor adjustment screw
80 carburetor adjustment screw coil spring
82 mounting screw

1964 to 1984 Harley-Davidson(tm) Motorcycle Embodiment 122 1964 to 1984 Harley-Davidson(tm) motorcycle
220 remote motorcycle idle adjustment control device of the present invention
228 bracket
230 bracket flat, vertically-oriented front portion
232 bracket front portion flat and rectangular-shaped intermediate part
234 bracket front portion intermediate part pair of spaced-apart and horizontally-oriented imaginary long sides
236 bracket front portion intermediate part front vertical edge
238 bracket front flat, vertically-oriented, and right-triangular-shaped upper portion
240 bracket front upper portion hypothenuse
242 bracket front upper portion horizontally-oriented imaginary base
244 bracket front upper portion vertically-oriented side
246 bracket front flat, vertically-oriented, and rectangular-shaped lower portion 248 bracket front lower portion horizontally-oriented imaginary upper long side
250 bracket front lower portion pair of vertically-oriented short sides
252 bracket obliquely-oriented and square-shaped top portion
254 bracket top portion flat and square-shaped inner surface
256 bracket top portion flat and square-shaped outer surface
258 bracket top portion substantially vertically-oriented mounting throughbore
260 bracket pair of flat, parallel, spaced-apart, vertically-oriented, and square-shaped side portions
262 bracket side portion center throughbore
268 slender, horizontally-oriented, rigid, and cylindrically-shaped shaft
270 cylindrically-shaped and externally-knurled adjustment knob
272 snap ring
274 elongated, slender, and flexible cable
276 flexible cable distal end
278 carburetor adjustment screw
280 carburetor adjustment screw coil spring
282 mounting screw
283 motorcycle engine rear cylinder head bottom existing hole
284 motorcycle engine rear cylinder head bottom
286 motorcycle engine rear cylinder head
288 motorcycle engine rear cylinder
289 motorcycle engine rear cylinder push rod tubes
290 motorcycle engine air cleaner

DETAILED DESCRIPTION OF THE PREFERRED EMBODIMENT

Referring now to the figures in which like numerals indicate like parts, and particularly to FIG. 1, which is a diagrammatic perspective view of the present invention installed on a typical Harley-Davidson(tm) motorcycle and being utilized to adjust the idle thereof, the remote motorcycle idle adjustment control device of the present invention is shown generally at 20 mounted to a 1985 to 1996 Harley-Davidson(tm) motorcycle 22, and shown generally at 120 mounted to a 1965 to 1984 Harley-Davidson(tm) motorcycle 122, and in either case being easily accessed and rotated by a motorcycle rider hand 24 of a motorcycle rider 26, while the motorcycle rider 26 is riding either the 1985 to 1996 Harley-Davidson(tm) motorcycle 22 or the 1965 to 1984 Harley-Davidson(tm) motorcycle 122.

The configuration of the remote motorcycle idle adjustment control device 20 for utilization on the 1985 to 1996 Harley-Davidson(tm) motorcycle 22 can best be seen in FIGS. 2–6, which are an enlarged diagrammatic perspective view of the area generally enclosed by the dotted ellipse identified by arrow 2 in FIG. 1 of a first embodiment of the present invention for utilization on 1985 to 1996 Harley-Davidson(tm) motorcycles, an enlarged diagrammatic perspective view of the area generally enclosed by the dotted ellipse identified by arrow 3 in FIG. 1, a diagrammatic top plan view taken generally in the direction of arrow 4 in FIG. 3, a diagrammatic front elevational view taken generally in the direction of arrow 5 in FIG. 4, and a diagrammatic end elevational view taken generally in the direction of arrow 6 in FIG. 5, respectively, and as such will be discussed with reference thereto.

The remote motorcycle idle adjustment control device 20 includes a bracket 28 that is preferably made from 0.10" metal.

The bracket 28 has a bracket flat, vertically-oriented, and rectangular-shaped front portion 30 with a length preferably of 1", a height preferably of 0.5", a bracket front portion short and vertically-oriented rear edge 32, and a bracket front portion short and vertically-oriented forward edge 34 that is parallel to, and disposed in front of, the bracket front portion short and vertically-oriented rear edge 32 of the bracket flat, vertically-oriented, and rectangular-shaped front portion 30 of the bracket 28.

The bracket 28 further has a bracket flat, vertically-oriented, and square-shaped rear side portion 36 that has a height equal to the height of the bracket flat, vertically-oriented, and rectangular-shaped front portion 30 of the bracket 28, and whose upper and lower edges are coplanar with the respective upper and lower edges of the bracket flat, vertically-oriented, and rectangular-shaped front portion 30 of the bracket 28.

The bracket flat, vertically-oriented, and square-shaped rear side portion 36 of the bracket 28 is integral with, and extends perpendicularly-rearwardly from the bracket front portion short and vertically-oriented rear edge 32 of the bracket flat, vertically-oriented, and rectangular-shaped front portion 30 of the bracket 28.

The bracket flat, vertically-oriented, and square-shaped rear side portion 36 of the bracket 28 further has a bracket rear portion flat and square-shaped outer surface 38 with a center, and a bracket rear portion flat and square-shaped inner surface 40 which is parallel to the bracket rear portion flat and square-shaped outer surface 38 of the bracket flat, vertically-oriented, and square-shaped rear side portion 36 of the bracket 28 and has a center.

The bracket flat, vertically-oriented, and square-shaped rear side portion 36 of the bracket 28 further has a bracket rear portion horizontally-oriented throughbore 42 that extends horizontally therethrough, from the center of the bracket rear portion flat and square-shaped outer surface 38 of the bracket flat, vertically-oriented, and square-shaped rear side portion 36 of the bracket 28 to the center of the bracket rear portion flat and square-shaped inner surface 40 of the bracket flat, vertically-oriented, and square-shaped rear side portion 36 of the bracket 28.

The bracket 28 further has a bracket flat, vertically-oriented, and rectangular-shaped front side portion 44 with a length preferably of 1", a height equal to the height of the bracket flat, vertically-oriented, and rectangular-shaped front portion 30 of the bracket 28, and whose upper and lower edges are coplanar with the respective upper and lower edges of the bracket flat, vertically-oriented, and rectangular-shaped front portion 30 of the bracket 28.

The bracket flat, vertically-oriented, and rectangular-shaped front side portion 44 of the bracket 28 extends, at a short vertical front edge thereof, perpendicularly-rearwardly from, and integral with, the bracket front portion short and vertically-oriented front edge 34 of the bracket flat, vertically-oriented, and rectangular-shaped front portion 30 of the bracket 28.

The bracket flat, vertically-oriented, and rectangular-shaped front side portion 44 of the bracket 28 is in front of, parallel to, and has a length greater than, the bracket flat, vertically-oriented, and square-shaped rear portion 34 of the bracket 28.

The bracket flat, vertically-oriented, and rectangular-shaped front side portion 44 of the bracket 28 further has a bracket front portion flat and rectangular-shaped outer surface 46 with a center, and a bracket front portion flat and rectangular-shaped inner surface 48 which is parallel to the bracket front portion flat and rectangular-shaped outer surface 46 of the bracket flat, vertically-oriented, and rectangular-shaped front side portion 44 of the bracket 28 and has a center.

The bracket flat, vertically-oriented, and rectangular-shaped front side portion 44 of the bracket 28 further has a bracket front portion horizontally-oriented throughbore 50 that extends horizontally therethrough, from the center of the bracket front portion flat and rectangular-shaped outer surface 46 of the bracket flat, vertically-oriented, and rectangular-shaped front side portion 44 of the bracket 28 to the center of the bracket front portion flat and rectangular-shaped inner surface 48 of the bracket flat, vertically-oriented, and rectangular-shaped front side portion 44 of the bracket 28, and is in alignment with the bracket rear portion horizontally-oriented throughbore 42 in the bracket flat, vertically-oriented, and square-shaped rear side portion 36 of the bracket 28.

The bracket 28 further has a bracket flat, vertically-oriented, and substantially right-triangular-shaped upper mounting portion 52 with a bracket upper mounting portion hypothenuse 54, a bracket upper mounting portion vertical side 56, a bracket upper mounting portion imaginary horizontal base 58 that is preferably 0.75" long and is perpendicular to the bracket upper mounting portion vertical side 56 of the bracket flat, vertically-oriented, and substantially right-triangular-shaped upper mounting portion 52 of the bracket 28, and a bracket upper mounting portion inner surface 59.

The bracket flat, vertically-oriented, and substantially right-triangular-shaped upper mounting portion 52 of the bracket 28, at the bracket upper mounting portion vertical side 56 of the bracket flat, vertically-oriented, and substantially right-triangular-shaped upper mounting portion 52 of the bracket 28, extends perpendicularly-forwardly from, and is integral with, the short vertical rear edge of the bracket flat, vertically-oriented, and rectangular-shaped front side portion 44 of the bracket 28, in a direction opposite and parallel to the bracket flat, vertically-oriented, and rectangular-shaped front portion 30 of the bracket 28.

The bracket 28 further has a bracket flat, vertically-oriented, and square-shaped lower mounting portion 60 that extends vertically downwardly from, is integral with, and has the same width as, the bracket upper mounting portion imaginary horizontal base 58 of the bracket flat, vertically-oriented, and substantially right-triangular-shaped upper mounting portion 52 of the bracket 28, and is coplanar with the bracket flat, vertically-oriented, and substantially right-triangular-shaped upper mounting portion 52 of the bracket 28.

The bracket flat, vertically-oriented, and square-shaped lower mounting portion 60 of the bracket 28 has a bracket lower mounting portion flat and square-shaped outer surface 62 with a center, and a bracket lower mounting portion flat and square-shaped inner surface 64 which is parallel to the bracket lower mounting portion flat and square-shaped outer surface 62 of the bracket flat, vertically-oriented, and square-shaped lower mounting portion 60 of the bracket 28 and has a center.

The bracket flat, vertically-oriented, and square-shaped lower mounting portion 60 of the bracket 28 further has a bracket lower mounting portion horizontally-oriented throughbore 66 that extends horizontally therethrough, from the center of the bracket lower mounting portion flat and square-shaped outer surface 62 of the bracket flat, vertically-oriented, and square-shaped lower mounting portion 60 of the bracket 28 to the center of the bracket lower mounting portion flat and square-shaped inner surface 64 of the bracket flat, vertically-oriented, and square-shaped lower mounting portion 60 of the bracket 28.

The combined height of the bracket flat, vertically-oriented, and substantially right-triangular-shaped upper mounting portion 52 of the bracket 28 and the bracket flat, vertically-oriented, and square-shaped lower mounting portion 60 of the bracket 28 is preferably 1.5".

The remote motorcycle idle adjustment control device 20 further includes a slender, horizontally-oriented, rigid, and cylindrically-shaped shaft 68 that extends rotatively through the bracket rear portion horizontally-oriented throughbore 42 in the bracket flat, vertically-oriented, and square-shaped rear side portion 36 of the bracket 28 to a distance slightly past the bracket flat, vertically-oriented, and square-shaped rear side portion 36 of the bracket 28, and rotatively through the bracket front portion horizontally-oriented throughbore 50 in the bracket flat, vertically-oriented, and rectangular-shaped front side portion 44 of the bracket 28 to a distance slightly past the bracket flat, vertically-oriented, and rectangular-shaped front side portion 44 of the bracket 28, and is parallel to the bracket flat, vertically-oriented, and rectangular-shaped front portion 30 of the bracket 28.

The remote motorcycle idle adjustment control device 20 further includes a cylindrically-shaped and externally-knurled adjustment knob 70 that has a 0.4" diameter and is attached to, for rotation with, the end of the slender, horizontally-oriented, rigid, and cylindrically-shaped shaft 68 that extends rotatively through the bracket rear portion horizontally-oriented throughbore 42 of the bracket flat, vertically-oriented, and square-shaped rear side portion 36 of the bracket 28, and abuts rotatively against, without extending past the edges of, the bracket rear portion flat and square-shaped outer surface 38 of the bracket flat, vertically-oriented, and square-shaped rear side portion 36 of the bracket 28.

The remote motorcycle idle adjustment control device 20 further includes a snap ring 72 that encircles the end of the horizontally-oriented, rigid, and cylindrically-shaped shaft 68 that extends rotatively through the bracket front portion horizontally-oriented throughbore 50 in the bracket flat, vertically-oriented, and rectangular-shaped front side portion 44 of the bracket 28, and is disposed at the bracket front portion horizontally-oriented throughbore 50 in the bracket flat, vertically-oriented, and rectangular-shaped front side portion 44 of the bracket 28, so that the slender, horizontally-oriented, rigid, and cylindrically-shaped shaft 68 is maintained in place.

The remote motorcycle idle adjustment control device 20 further includes an elongated, slender, and flexible cable 74, so that the required bends to route to the carburetor can be achieved. The elongated, slender, and flexible cable 74 is covered with heat shrink tube not only for appearance, but more importantly for prevent chafing between the elongated, slender, and flexible cable 74 and the air cleaner assembly.

The elongated, slender, and flexible cable 74 is brazed at a proximal end thereof to the end of the slender horizontally-oriented, rigid, and cylindrically-shaped shaft 68 that extends rotatively through the bracket front portion horizontally oriented throughbore 50 in the bracket flat, vertically-oriented, and rectangular-shaped front side portion 44 of the bracket 28, and extends collinearly forwardly therefrom to a flexible cable distal end 76.

The remote motorcycle idle adjustment control device 20 further includes a carburetor adjustment screw 78 whose head is brazed to the flexible cable distal end 76 of the elongated, slender, and flexible cable 74 and whose threaded portion extends collinearly therefrom. The carburetor adjustment screw 78 is threadably mounted to the carburetor.

The combined length of the elongated, slender, and flexible cable 74 and the carburetor adjustment screw 78 is preferably approximately 6".

The remote motorcycle idle adjustment control device 20 further includes a carburetor adjustment screw coil spring 80 that encircles the threaded portion of the carburetor adjustment screw 78 and abuts against the head thereof, so that the adjustment screw 78 is maintained in place once adjustment has been made to the carburetor.

The remote motorcycle idle adjustment control device 20 further includes a mounting screw 82 that passes through the bracket lower mounting portion horizontally-oriented throughbore 66 in the bracket flat, vertically-oriented, and square-shaped lower mounting portion 60 of the bracket 28 and into an existing hole in the engine rear cylinder, with the bracket lower mounting portion flat and square-shaped inner surface 64 of the bracket flat, vertically-oriented, and square-shaped lower mounting portion 60 of the bracket 28 abutting against the engine rear cylinder.

With reference to FIG. 3, which is an enlarged diagrammatic perspective view of the area generally enclosed by the dotted ellipse identified by arrow 3 in FIG. 1, the configuration of the bracket 28 is significant and of critical importance for, inter alia:

1) The space defined by the bracket flat, vertically-oriented, and square-shaped rear side portion 36 of the bracket 28, the bracket flat, vertically-oriented, and rectangular-shaped front portion 30 of the bracket 28, and the bracket flat, vertically-oriented, and rectangular-shaped front side portion 44 of the bracket 28 provides clearance for the motorcycle engine rear cylinder cooling fins 84 of the motorcycle engine rear cylinder 86 of the motorcycle engine 88 of the 1985 to 1996 Harley-Davidson(tm) motorcycle 22 and the motorcycle engine oil pressure gauge cable 90 of the motorcycle engine oil pressure gauge 92 of the motorcycle engine 88 of the 1985 to 1996 Harley-Davidson(tm) motorcycle 22.

2) The length of the bracket flat, vertically-oriented, and square-shaped rear side portion 36 of the bracket 28 provides clearance for the cylindrically-shaped and externally-knurled adjustment knob 70 from the motorcycle engine push rod tubes 94 of the motorcycle engine 88 of the 1985 to 1996 Harley-Davidson(tm) motorcycle 22 for easy rotation thereof.

3) The offset of the combined bracket flat, vertically-oriented, and substantially right-triangular-shaped upper mounting portion 52 of the bracket 28 and the bracket flat, vertically-oriented, and square-shaped lower mounting portion 60 of the bracket 28 from the bracket flat, vertically-oriented, and rectangular-shaped front portion 30 of the bracket 28 provides clearance for the motorcycle engine air cleaner assembly 96 of the motorcycle engine 88 of the 1985 to 1996 Harley-Davidson(tm) motorcycle 22.

4) The position of the bracket lower mounting portion horizontally-oriented throughbore 66 in the bracket flat, vertically-oriented, and square-shaped lower mounting portion 60 of the bracket 28 provides for easily mounting of the bracket 28 to the motorcycle engine rear cylinder 86 of the motorcycle engine 88 of the 1985 to 1996 Harley-Davidson(tm) motorcycle 22, ipso facto, is in alignment with a motorcycle engine rear cylinder existing hole 98 in the motorcycle engine rear cylinder 86 of the motorcycle engine 88 of the 1985 to 1996 Harley-Davidson(tm) motorcycle 22.

The configuration of the remote motorcycle idle adjustment control device 220 for utilization on the 1964 to 1984 Harley-Davidson(tm) motorcycle 122 can best be seen in FIGS. 7–11, which are an enlarged diagrammatic perspective view of the area generally enclosed by the dotted ellipse identified by arrow 7 in FIG. 1 of a second embodiment of the present invention for utilization on 1965 to 1984 Harley-Davidson(tm) motorcycles, an enlarged diagrammatic perspective view of the area generally enclosed by the dotted ellipse identified by arrow 8 in FIG. 7, a diagrammatic top plan view taken generally in the direction of arrow 9 in FIG. 8, a diagrammatic front elevational view taken generally in the direction of arrow 10 in FIG. 9, and a diagrammatic end elevational view taken generally in the direction of arrow 11 in FIG. 10, respectively, and as such will be discussed with reference thereto.

The remote motorcycle idle adjustment control device 220 includes a bracket 228 that is preferably made from 0.10" metal.

The bracket 228 has a bracket flat, vertically-oriented front portion 230 with a bracket front portion flat and rectangular-shaped intermediate part 232 having a bracket front portion intermediate part pair of spaced-apart and horizontally-oriented imaginary long sides 234 and a bracket front portion intermediate part front vertical edge 236.

The bracket flat, vertically-oriented front portion 230 of the bracket 228 further has a bracket front flat, vertically-oriented, and right-triangular-shaped upper portion 238 with a bracket front upper portion hypothenuse 240, a bracket front upper portion horizontally-oriented imaginary base 242 that is 0.9" long, and a bracket front upper portion vertically-oriented side 244 that is perpendicular to the bracket front upper portion horizontally-oriented base 242 of the bracket front flat, vertically-oriented, and right-triangular-shaped upper portion 238 of the bracket flat, vertically-oriented front portion 230 of the bracket 228.

The bracket front flat, vertically-oriented, and right-triangular-shaped upper portion 238 of the bracket 228 extends coplanarly upwardly from, and is integral with, the bracket front portion flat and rectangular-shaped intermediate part 232 of the bracket flat, vertically-oriented front portion 230 of the bracket 228, with the bracket front upper portion horizontally-oriented imaginary base 242 of the bracket front flat, vertically-oriented, and right-triangular-shaped upper portion 238 of the bracket 228 being coincident with, and of equal length as, the uppermost long side of the bracket front portion intermediate part pair of spaced-apart and horizontally-oriented imaginary long sides 234 of the bracket front portion flat and rectangular-shaped intermediate part 232 of the bracket flat, vertically-oriented front portion 230 of the bracket 228, and with the bracket front portion intermediate part front vertical edge 236 of the bracket front portion flat and rectangular-shaped intermediate part 232 of the bracket flat, vertically-oriented front portion 230 of the bracket 228 being collinear with the bracket front upper portion vertically-oriented side 244 of the bracket front flat, vertically-oriented, and right-triangular-shaped upper portion 238 of the bracket flat, vertically-oriented front portion 230 of the bracket 228.

The bracket flat, vertically-oriented front portion 230 of the bracket 228 further has a bracket front flat, vertically-oriented, and rectangular-shaped lower portion 246 with a bracket front lower portion horizontally-oriented imaginary upper long side 248 that is 1" long, and a bracket front lower portion pair of vertically-oriented short sides 250.

The bracket front flat, vertically-oriented, and rectangular-shaped lower portion 246 of the bracket flat, vertically-oriented front portion 230 of the bracket 228 extends coplanarly downwardly from, and is integral with, the bracket front portion flat and rectangular-shaped intermediate part 232 of the bracket flat, vertically-oriented front portion 230 of the bracket 228, with the bracket front lower portion horizontally-oriented imaginary upper long side 248 of the bracket front flat, vertically-oriented, and rectangular-shaped lower portion 246 of the bracket flat, vertically-oriented front portion 230 of the bracket 228 being coincident with, and extending slightly past both ends of, the lowermost long side of the bracket front portion intermediate part pair of spaced-apart and horizontally-oriented imaginary long sides 234 of the bracket front portion flat and rectangular-shaped intermediate part 232 of the bracket flat, vertically-oriented front portion 230 of the bracket 228.

The bracket 228 further has a bracket obliquely-oriented and square-shaped top portion 252 with 1.5" sides, a bracket top portion flat and square-shaped inner surface 254 that has a center, and a bracket top portion flat and square-shaped outer surface 256 that has a center.

The bracket obliquely-oriented and square-shaped top portion 252 of the bracket 228 further has a bracket top portion substantially vertically-oriented mounting throughbore 258 extending substantially vertically therethrough, from the center of the bracket top portion flat and square-shaped inner surface 254 of the bracket obliquely-oriented and square-shaped top portion 252 of the bracket 228 to the center of the bracket top portion flat and square-shaped outer surface 256 of the bracket obliquely-oriented and square-shaped top portion 252 of the bracket 228.

The bracket obliquely-oriented and square-shaped top portion 252 of the bracket 228 extends perpendicularly rearwardly from, and is integral with, the bracket front flat, vertically-oriented, and right-triangular-shaped upper portion 238 of the bracket flat, vertically-oriented front portion 230 of the bracket 228, with a side of the bracket obliquely-oriented and square-shaped top portion 252 of the bracket 228 being coincident with, and of equal length as, the bracket front upper portion hypothenuse 240 of the bracket front flat, vertically-oriented, and right-triangular-shaped upper portion 238 of the bracket flat, vertically-oriented front portion 230 of the bracket 228, and with its orientation being oblique to that of the bracket flat, vertically-oriented front portion 230 of the bracket 228.

The bracket 228 further has a bracket pair of flat, parallel, spaced-apart, vertically-oriented, and square-shaped side portions 260. Each side portion of the bracket pair of flat, parallel, spaced-apart, vertically-oriented, and square-shaped side portions 260 of the bracket 228 extends perpendicularly rearwardly from, is integral with, and has the same height as, a respective short side of the bracket front lower portion pair of vertically-oriented short sides 250 of the bracket front flat, vertically-oriented, and rectangular-shaped lower portion 246 of the bracket flat, vertically-oriented front portion 230 of the bracket 228.

The bracket pair of flat, parallel, spaced-apart, vertically-oriented, and square-shaped side portions 260 of the bracket 228 extend perpendicularly rearwardly from the bracket front lower portion pair of vertically-oriented short sides 250 of the bracket front flat, vertically-oriented, and rectangular-shaped lower portion 246 of the bracket flat, vertically-oriented front portion 230 of the bracket 228, to a distance less than that of the rearward extension of the bracket obliquely-oriented and square-shaped top portion 252 of the bracket 228.

Each side portion of the bracket pair of flat, parallel, spaced-apart, vertically-oriented, and square-shaped side portions 260 of the bracket 228 has a center with a bracket side portion center throughbore 262 that extends horizontally through the center thereof.

The remote motorcycle idle adjustment control device 220 further includes a slender, horizontally-oriented, rigid, and cylindrically-shaped shaft 268 that extends rotatively through the bracket side portion center throughbore 262 of each side portion of the bracket pair of flat, parallel, spaced-apart, vertically-oriented, and square-shaped side portions 260 of the bracket 228 to a distance slightly past each side portion of the bracket pair of flat, parallel, spaced-apart, vertically-oriented, and square-shaped side portions 260 of the bracket 228, and is parallel to the bracket flat, vertically-oriented front portion 230 of the bracket 228.

The remote motorcycle idle adjustment control device 220 further includes a cylindrically-shaped and externally-knurled adjustment knob 270 that has a 0.4" diameter and is attached to, for rotation with, the end of the slender, horizontally-oriented, rigid, and cylindrically-shaped shaft 268 that extends rotatively through the bracket side portion center throughbore 262 of the rearmost side portion of the bracket pair of flat, parallel, spaced-apart, vertically-oriented, and square-shaped side portions 260 of the bracket 228, and abuts rotatively against, without extending past the edges of, the outer surface of the rearmost side portion of the bracket pair of flat, parallel, spaced-apart, vertically-oriented, and square-shaped side portions 260 of the bracket 228.

The remote motorcycle idle adjustment control device 220 further includes a snap ring 272 that encircles the end of the horizontally-oriented, rigid, and cylindrically-shaped shaft 268 that extends rotatively through the bracket side portion center throughbore 262 of the forwardmost side portion of the bracket pair of flat, parallel, spaced-apart, vertically-oriented, and square-shaped side portions 260 of the bracket 228, and is disposed at the bracket side portion center throughbore 262 of the forwardmost side portion of the bracket pair of flat, parallel, spaced-apart, vertically-oriented, and square-shaped side portions 260 of the bracket 228, so that the slender, horizontally-oriented, rigid, and cylindrically-shaped shaft 268 is maintained in place.

The remote motorcycle idle adjustment control device 220 further includes an elongated, slender, and flexible cable 274, so that the required bends to route to the carburetor can be achieved. The elongated, slender, and flexible cable 274 is covered with heat shrink tube not only for appearance, but more importantly for prevent chafing between the elongated, slender, and flexible cable 274 and the air cleaner assembly.

The elongated, slender, and flexible cable 274 is brazed at a proximal end thereof to the end of the slender horizontally-oriented, rigid, and cylindrically-shaped shaft 268 that extends rotatively through the bracket side portion center throughbore 262 of the forwardmost side portion of the bracket pair of flat, parallel, spaced-apart, vertically-oriented, and square-shaped side portions 260 of the bracket 228, and extends collinearly forwardly therefrom to a flexible cable distal end 276.

The remote motorcycle idle adjustment control device 220 further includes a carburetor adjustment screw 278 whose head is brazed to the flexible cable distal end 276 of the elongated, slender, and flexible cable 274 and whose threaded portion extends collinearly therefrom. The carburetor adjustment screw 278 is threadably mounted to the carburetor.

The combined length of the elongated, slender, and flexible cable 274 and the carburetor adjustment screw 278 is preferably approximately 6".

The remote motorcycle idle adjustment control device 220 further includes a carburetor adjustment screw coil spring 280 that encircles the threaded portion of the carburetor adjustment screw 278 and abuts against the head thereof, so that the adjustment screw 278 is maintained in place once adjustment has been made to the carburetor.

The remote motorcycle idle adjustment control device 220 further includes a mounting screw 282 that passes through the bracket top portion substantially vertically-oriented mounting throughbore 258 in the bracket obliquely-oriented and square-shaped top portion 252 of the bracket 228 and into an existing hole in the bottom of the engine rear cylinder head, with the bracket top portion flat and square-shaped outer surface 256 of the bracket obliquely-oriented and square-shaped top portion 252 of the bracket 228 abutting against the engine rear cylinder.

With reference to FIG. 7, which is an enlarged diagrammatic perspective view of the area generally enclosed by the dotted ellipse identified by arrow 7 in FIG. 1, the configuration of the bracket 228 is significant and of critical importance for, inter alia:

1) The bracket front flat, vertically-oriented, and rectangular-shaped lower portion 246 of the bracket flat, vertically-oriented front portion 230 of the bracket 228 extending slightly past the bracket front portion flat and rectangular-shaped intermediate part 232 of the bracket flat, vertically-oriented front portion 230 of the bracket 228 allows the bracket pair of flat, parallel, spaced-apart, vertically-oriented, and square-shaped side portions 260 of the bracket 228 to be easily bent perpendicularly rearwardly from the bracket front flat, vertically-oriented, and rectangular-shaped lower portion 246 of the bracket flat, vertically-oriented front portion 230 of the bracket 228.

2) The oblique orientation of the bracket obliquely-oriented and square-shaped top portion 252 of the bracket 228 relative to the bracket flat, vertically-oriented front portion 230 of the bracket 228 allows the slender, horizontally-oriented, rigid, and cylindrically-shaped shaft 268 to remain horizontal and thereby allowing the cylindrically-shaped and externally-knurled adjustment knob 270 to be easily accessible for rotation thereof when the bracket is mounted to an motorcycle engine rear cylinder head bottom existing hole 283 in the motorcycle engine rear cylinder head bottom 284 of the motorcycle engine rear cylinder head 286 of the motorcycle engine rear cylinder 288 of the 1965 to 1984 Harley-Davidson (tm) motorcycles 122, ipso facto, the motorcycle engine rear cylinder head bottom 284 of the motorcycle engine rear cylinder head 286 of the motorcycle engine rear cylinder 288 of the 1965 to 1984 Harley-Davidson(tm) motorcycles 122 is in itself obliquely oriented.

3) The square shape of the bracket obliquely-oriented and square-shaped top portion 252 of the bracket 228 provides a surface area that is sufficient in size to provide for a secure mounting thereof against the motorcycle engine rear cylinder head bottom 284 of the motorcycle engine rear cylinder head 286 of the motorcycle engine rear cylinder 288 of the 1965 to 1984 Harley-Davidson(tm) motorcycles 122, ipso facto, matches the shape of the motorcycle engine rear cylinder head bottom 284 of the motorcycle engine rear cylinder head 286 of the motorcycle engine rear cylinder 288 of the 1965 to 1984 Harley-Davidson(tm) motorcycles 122.

4) The position of the bracket top portion substantially vertically-oriented mounting throughbore 258 in the bracket obliquely-oriented and square-shaped top portion 252 of the bracket 228 provides for easily mounting of the bracket 228 to the motorcycle engine rear cylinder head bottom 284 of the motorcycle engine rear cylinder head 286 of the motorcycle engine rear cylinder 288 of the 1965 to 1984 Harley-Davidson(tm) motorcycles 122, ipso facto, is in alignment with the motorcycle engine rear cylinder head bottom existing hole 283 in the motorcycle engine rear cylinder head bottom 284 of the motorcycle engine rear cylinder head 286 of the motorcycle engine rear cylinder 288 of the 1965 to 1984 Harley-Davidson (tm) motorcycles.

5) The shape of the combined bracket front flat, vertically-oriented, and rectangular-shaped lower portion 246 of the bracket flat, vertically-oriented front portion 230 of the bracket 228 and the bracket front portion flat and rectangular-shaped intermediate part 232 of the bracket flat, vertically-oriented front portion 230 of the bracket 228 allows the bracket 228 to be comfortably nested between the motorcycle engine rear cylinder push rod tubes 289 of the motorcycle engine rear cylinder 288 of the 1965 to 1984 Harley-Davidson(tm) motorcycles 122, without contacting the motorcycle engine air cleaner 290 of the 1965 to 1984 Harley-Davidson(tm) motorcycles 122.

6) The bracket pair of flat, parallel, spaced-apart, vertically-oriented, and square-shaped side portions 260 of the bracket 228 extending perpendicularly rearwardly from the bracket front lower portion pair of vertically-oriented short sides 250 of the bracket front flat, vertically-oriented, and rectangular-shaped lower portion 246 of the bracket flat, vertically-oriented front portion 230 of the bracket 228, to a distance less than that of the rearward extension of the bracket obliquely-oriented and square-shaped top portion 252 of the bracket 228 provides clearance for the bracket 228 from the engine rear cylinder 288 of the 1965 to 1984 Harley-Davidson(tm) motorcycles 122 while allowing the cylindrically-shaped and externally-knurled adjustment knob 270 to clear the rearmost push rod tube of the motorcycle engine rear cylinder push rod tubes 289 of the motorcycle engine rear cylinder 288 of the 1965 to 1984 Harley-Davidson(tm) motorcycles 122 for easy accessibility and rotation thereof.

It will be understood that each of the elements described above, or two or more together, may also find a useful application in other types of constructions differing from the types described above.

While the invention has been illustrated and described as embodied in a remote motorcycle idle adjustment control device, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A remote motorcycle idle adjustment control device attachable to a motorcycle and which allows the remote adjustment of a carburetor of the motorcycle by a rider while the rider is riding the motorcycle, comprising:

a) a bracket attachable to an engine of the motorcycle at a position remote from the carburetor of the motorcycle wherein the position is one of:

i) at an existing hole in, and in abutment against, a rear cylinder of the engine of the motorcycle and straddling and clearing cooling fins of the rear cylinder of the engine of the motorcycle and straddling and clearing a cable of an oil pressure gauge of the engine of the motorcycle and clearing an air cleaner assembly of the engine of the motorcycle and clearing push rod tubes of the engine of the motorcycle, so that said bracket conforms to the configuration of the engine of the motorcycle; and ii) at an existing hole in, and in abutment against, a bottom of an obliquely-oriented cylinder head of the rear cylinder of the engine of the motorcycle and nested between and clearing the push rod tubes of the rear cylinder of the engine of the motorcycle and clearing the engine air cleaner assembly of the engine of the motorcycle and clearing the rear cylinder of the engine of the motorcycle, so that said bracket conforms to the configuration of the engine of the motorcycle;

b) a slender, horizontally-oriented, rigid, and cylindrically-shaped shaft extending rotatively through said bracket and having aproximal end and a distal end;

c) a cylindrically-shaped and externally-knurled adjustment knob having a diameter and being attached to, for rotation with, said proximal end of said slender, horizontally-oriented, rigid, and cylindrically-shaped shaft;

d) an elongated, slender, and flexible cable having a length and being attached at a proximal end thereof collinearly to, and for rotation with, said distal end of said slender, horizontally-oriented, rigid, and cylindrically-shaped shaft and having a distal end, so that required bends to route said elongated, slender, and flexible cable to the carburetor of the motorcycle can be achieved; and e) a carburetor adjustment screw having a length, a head attached to, for rotation with, said distal end of said elongated, slender, and flexible cable, and a threaded portion extending collinearly with said distal end of said elongated, slender, and flexible cable and threadably engaging, for adjustment of, the carburetor of the motorcycle, so that when said cylindrically-shaped and externally-knurled adjustment knob is rotated by the rider from the position remote from the carburetor of the motorcycle while the rider is riding the motorcycle, said slender, horizontally-oriented, rigid, and cylindrically-shaped shaft is caused to rotate in said bracket which in turn causes said elongated, slender, and flexible cable to rotate which in turn causes said carburetor adjustment screw to rotate in the carburetor and adjust the carburetor of the motorcycle while the rider is riding the motorcycle allowing for a more accurate adjustment.

2. The device as defined in claim 1, wherein said bracket is made from 0.10" metal.

3. The device as defined in claim 1, wherein said diameter of said cylindrically-shaped and externally-knurled adjustment knob is 0.4".

4. The device as defined in claim 1, wherein said bracket has a flat, vertically-oriented, and rectangular-shaped front portion with a height, a length, a short and vertically-oriented rear edge, and a short and vertically-oriented forward edge that is parallel to, and disposed in front of, said short and vertically-oriented rear edge of said flat, vertically-oriented, and rectangular-shaped front portion of said bracket.

5. The device as defined in claim 4, wherein said length of said flat, vertically-oriented, and rectangular-shaped front portion of said bracket is 1", and said height of said flat, vertically-oriented, and rectangular-shaped front portion of said bracket is 0.5".

6. The device as defined in claim 4, wherein said bracket further has a flat, vertically-oriented, and square-shaped rear side portion that has a height equal to said height of said flat, vertically-oriented, and rectangular-shaped front portion of said bracket, and whose upper and lower edges are coplanar with respective upper and lower edges of said flat, vertically-oriented, and rectangular-shaped front portion of said bracket; said flat, vertically-oriented, and square-shaped rear side portion of said bracket is integral with, and extends perpendicularly-rearwardly from, said short and vertically-oriented rear edge of said flat, vertically-oriented, and rectangular-shaped front portion of said bracket; said flat, vertically-oriented, and square-shaped rear side portion of said bracket further has a flat and square-shaped outer surface with a center and a flat and square-shaped inner surface that is parallel to said flat and square-shaped outer surface of said flat, vertically-oriented, and square-shaped rear side portion of said bracket and has a center; said flat, vertically-oriented, and square-shaped rear side portion of said bracket further has a horizontally-oriented throughbore that extends horizontally therethrough, from said center of said flat and square-shaped outer surface of said flat, vertically-oriented, and square-shaped rear side portion of said bracket to said center of said flat and square-shaped inner surface of said flat, vertically-oriented, and square-shaped rear side portion of said bracket.

7. The device as defined in claim 6, wherein said bracket further has a flat, vertically-oriented, and rectangular-shaped front side portion with a length, a height equal to said height of said flat, vertically-oriented, and rectangular-shaped front portion of said bracket, and whose upper and lower edges are coplanar with said respective upper and lower edges of said flat, vertically-oriented, and rectangular-shaped front portion of said bracket; said flat, vertically-oriented, and rectangular-shaped front side portion of said bracket is integral with, and extends at a short and vertically-oriented front edge thereof, perpendicularly-rearwardly from said short and vertically-oriented front edge of said flat, vertically-oriented, and rectangular-shaped front portion of said bracket; said flat, vertically-oriented, and rectangular-shaped front side portion of said bracket further has a flat and rectangular-shaped outer surface with a center and a flat and rectangular-shaped inner surface that is parallel to said flat and rectangular-shaped outer surface of said flat, vertically-oriented, and rectangular-shaped front side portion of said bracket and has a center; said flat, vertically-oriented, and rectangular-shaped front side portion of said bracket further has a horizontally-oriented throughbore that extends horizontally therethrough, from said center of said flat and rectangular-shaped outer surface of said flat, vertically-oriented, and rectangular-shaped front side portion of said bracket to said center of said flat and rectangular-shaped inner surface of said flat, vertically-oriented, and rectangular-shaped front side portion of said bracket, and is in alignment with said horizontally-oriented throughbore in said flat, vertically-oriented, and square-shaped rear side portion of said bracket; said flat, vertically-oriented, and rectangular-shaped front side portion of said bracket is disposed in front of, parallel to, and has a length greater than, said flat, vertically-oriented, and square-shaped rear portion of said bracket, so that an offset is formed that provides clearance for said cylindrically-shaped and externally-knurled adjustment knob from the push rod tubes of the engine of the motorcycle for easy rotation thereof; said flat, vertically-oriented, and square-shaped rear side portion of said bracket, said flat, vertically-oriented, and rectangular-shaped front portion of said bracket, and said flat, vertically-oriented, and rectangular-shaped front side portion of said bracket define a space, so that clearance is provided for the cooling fins of the rear cylinder of the engine of the motorcycle and for the cable of the oil pressure gauge of the engine of the motorcycle.

8. The device as defined in claim 7, wherein said length of said flat, vertically-oriented, and rectangular-shaped front side portion of said bracket is 1".

9. The device as defined in claim 7, wherein said bracket further has a flat, vertically-oriented, and substantially right-triangular-shaped upper mounting portion with a height, a hypothenuse, a vertical side, an imaginary horizontal base that is perpendicular to said vertical side of said flat, vertically-oriented, and substantially right-triangular-shaped upper mounting portion of said bracket, and an inner surface; said flat, vertically-oriented, and substantially right-triangular-shaped upper mounting portion of said bracket is integral with, and extends perpendicularly-forwardly from, said bracket flat, vertically-oriented, and rectangular-shaped front side portion of said bracket, in a direction opposite and parallel to said flat, vertically-oriented, and rectangular-shaped front portion of said bracket, and with said vertical side of said flat, vertically-oriented, and substantially right-triangular-shaped upper mounting portion of said bracket being coincident with a short and vertically-oriented rear edge of said flat, vertically-oriented, and rectangular-shaped front side portion of said bracket, so that an offset is formed that provides clearance for the air cleaner assembly of the motorcycle.

10. The device as defined in claim 9, wherein said imaginary horizontal base of said flat, vertically-oriented, and substantially right-triangular-shaped upper mounting portion of said bracket is 0.75" long.

11. The device as defined in claim 9, wherein said bracket further has a flat, vertically-oriented, and square-shaped lower mounting portion that has a height, is integral and coplanar with, and extends vertically downwardly from, said flat, vertically-oriented, and substantially right-triangular-shaped upper mounting portion of said bracket, with an upper horizontally-oriented side thereof being coincident with, and of equal width as, said imaginary horizontal base of said flat, vertically-oriented, and substantially right-triangular-shaped upper mounting portion of said bracket; said flat, vertically-oriented, and square-shaped lower mounting portion of said bracket has a flat and square-shaped outer surface with a center and a flat and square-shaped inner surface which is parallel to said flat and square-shaped outer surface of said flat, vertically-oriented, and square-shaped lower mounting portion of said bracket and has a center; said flat, vertically-oriented, and square-shaped lower mounting portion of said bracket further has a horizontally-oriented throughbore that extends horizontally therethrough, from said center of said flat and square-shaped outer surface of said flat, vertically-oriented, and square-shaped lower mounting portion of said bracket to said center of said flat and square-shaped inner surface of said flat, vertically-oriented, and square-shaped lower mounting portion of said bracket, and is alignable with the existing hole in the rear cylinder of the engine of the motorcycle, so that easy mounting of said bracket to the rear cylinder of the engine of the motorcycle is provided.

12. The device as defined in claim 11, wherein said height of said flat, vertically-oriented, and substantially right-triangular-shaped upper mounting portion of said bracket plus said height of said flat, vertically-oriented, and square-shaped lower mounting portion of said bracket is 1.5".

13. The device as defined in claim 7, wherein said slender, horizontally-oriented, rigid, and cylindrically-shaped shaft extends at said proximal end thereof rotatively through said horizontally-oriented throughbore in said flat, vertically-oriented, and square-shaped rear side portion of said bracket to a distance slightly past said flat, vertically-oriented, and square-shaped rear side portion of said bracket, and extends at said distal end thereof rotatively through said horizontally-oriented throughbore in said flat, vertically-oriented, and rectangular-shaped front side portion of said bracket to a distance slightly past said flat, vertically-oriented, and rectangular-shaped front side portion of said bracket, and is parallel to said flat, vertically-oriented, and rectangular-shaped front portion of said bracket.

14. The device as defined in claim 13, wherein said cylindrically-shaped and externally-knurled adjustment knob abuts rotatively against, without extending past edges of, said flat and square-shaped outer surface of said flat, vertically-oriented, and square-shaped rear side portion of said bracket.

15. The device as defined in claim 7; further comprising a snap ring encircling said distal end of said slender, horizontally-oriented, rigid, and cylindrically-shaped shaft and being disposed at said horizontally-oriented throughbore in said flat, vertically-oriented, and rectangular-shaped front side portion of said bracket, so that said slender, horizontally-oriented, rigid, and cylindrically-shaped shaft is maintained in place.

16. The device as defined in claim 1, wherein said elongated, slender, and flexible cable is covered with heat shrink tube, so that chafing between said elongated, slender, and flexible cable and the air cleaner assembly of the engine of the motorcycle is prevented while aesthetics are improved.

17. The device as defined in claim 1, wherein said proximal end of said elongated, slender, and flexible cable is brazed to said distal end of said slender, horizontally-oriented, rigid, and cylindrically-shaped shaft.

18. The device as defined in claim 1, wherein said head of said carburetor adjustment screw is brazed to said distal end of said elongated, slender, and flexible cable.

19. The device as defined in claim 1, wherein said length of said elongated, slender, and flexible cable plus said length of said carburetor adjustment screw is approximately 6".

20. The device as defined in claim 1; further comprising a coil spring encircling said threaded portion of said carburetor adjustment screw and abutting against said head thereof, so that said adjustment screw is maintained in place in the carburetor once adjustment has been made to the carburetor.

21. The device as defined in claim 11; further comprising a mounting screw passing through said horizontally-oriented throughbore in said flat, vertically-oriented, and square-shaped lower mounting portion of said bracket and into the existing hole in the rear cylinder of the engine of the motorcycle, with said flat and square-shaped inner surface of said flat, vertically-oriented, and square-shaped lower mounting portion of said bracket abutting against the rear cylinder of the engine of the motorcycle.

22. The device as defined in claim 1, wherein said bracket has a flat, vertically-oriented front portion with a flat and rectangular-shaped intermediate part that has a pair of spaced-apart and horizontally-oriented imaginary long sides, and a front vertical edge.

23. The device as defined in claim 22, wherein said flat, vertically-oriented front portion of said bracket further has a flat, vertically-oriented, and right-triangular-shaped upper portion with a hypothenuse, a horizontally-oriented imaginary base, and a vertically-oriented side that is perpendicular to said horizontally-oriented base of said flat, vertically-oriented, and right-triangular-shaped upper portion of said flat, vertically-oriented front portion said bracket; said flat, vertically-oriented, and right-triangular-shaped upper portion of said flat, vertically-oriented front portion of said bracket extends coplanarly upwardly from, and is integral with, said flat and rectangular-shaped intermediate part of said flat, vertically-oriented front portion of said bracket, with said horizontally-oriented imaginary base of said flat, vertically-oriented, and right-triangular-shaped upper portion of said flat, vertically-oriented front portion of said bracket being coincident with, and of equal length as, an uppermost long side of said pair of spaced-apart and horizontally-oriented imaginary long sides of said flat and rectangular-shaped intermediate part of said flat, vertically-oriented front portion of said bracket, and with said front vertical edge of said flat and rectangular-shaped intermediate part of said flat, vertically-oriented front portion of said bracket being collinear with said vertically-oriented side of said flat, vertically-oriented, and right-triangular-shaped upper portion of said flat, vertically-oriented front portion of said bracket.

24. The device as defined in claim 23, wherein said horizontally-oriented imaginary base of said flat, vertically-oriented, and right-triangular-shaped upper portion of said flat, vertically-oriented front portion of said bracket is 0.9" long.

25. The device as defined in claim 22, wherein said flat, vertically-oriented front portion of said bracket further has a vertically-oriented, and rectangular-shaped lower portion with a horizontally-oriented imaginary upper long side that has a length, and a pair of vertically-oriented short sides; said flat, vertically-oriented, and rectangular-shaped lower portion of said flat, vertically-oriented front portion of said bracket extends coplanarly downwardly from, and is integral with, said flat and rectangular-shaped intermediate part of said flat, vertically-oriented front portion of said bracket, with said horizontally-oriented imaginary upper long side of said flat, vertically-oriented, and rectangular-shaped lower portion of said flat, vertically-oriented front portion of said bracket being coincident with, and extending slightly past both ends of, a lowermost long side of said pair of spaced-apart and horizontally-oriented imaginary long sides of said flat and rectangular-shaped intermediate part of said flat, vertically-oriented front portion of said bracket.

26. The device as defined in claim 25, wherein said length of said horizontally-oriented imaginary upper long side of said vertically-oriented, and rectangular-shaped lower portion of said flat, vertically-oriented front portion of said bracket is 1".

27. The device as defined in claim 23, wherein said bracket further has an obliquely-oriented and square-shaped top portion with a width, a flat and square-shaped inner surface that has a center, and a flat and square-shaped outer surface that has a center and is parallel to said flat and square-shaped inner surface of said obliquely-oriented and square-shaped top portion of said bracket; said obliquely-oriented and square-shaped top portion of said bracket further has a substantially vertically-oriented throughbore that extends substantially vertically therethrough, from said center of said flat and square-shaped inner surface of said obliquely-oriented and square-shaped top portion of said bracket to said center of said flat and square-shaped outer surface of said obliquely-oriented and square-shaped top portion of said bracket, and is alignable with the existing hole in the obliquely-oriented bottom of the cylinder head of the rear cylinder of the engine of the motorcycle, so that easy mounting of said bracket to the obliquely-oriented bottom of the cylinder head of the rear cylinder of the engine of the motorcycle is provided; said obliquely-oriented and square-shaped top portion of said bracket extends perpendicularly rearwardly from, and is integral with, said flat, vertically-oriented, and right-triangular-shaped upper portion of said flat, vertically-oriented front portion of said bracket, with a side of said obliquely-oriented and square-shaped top portion of said bracket being coincident with, and of equal length as, said hypothenuse of said flat, vertically-oriented, and right-triangular-shaped upper portion of said flat, vertically-oriented front portion of said bracket, and with its orientation being oblique to that of said flat, vertically-oriented front portion of said bracket.

28. The device as defined in claim 27, wherein said width of said obliquely-oriented and square-shaped top portion of said bracket is 1.5".

29. The device as defined in claim 25, wherein said bracket further has a pair of flat, parallel, spaced-apart, vertically-oriented, and square-shaped side portions; each side portion of said pair of flat, parallel, spaced-apart, vertically-oriented, and square-shaped side portions of said bracket extends perpendicularly rearwardly from, is integral with, and has same height as, a respective short side of said pair of vertically-oriented short sides of said flat, vertically-oriented, and rectangular-shaped lower portion of said flat, vertically-oriented front portion of said bracket; said pair of flat, parallel, spaced-apart, vertically-oriented, and square-shaped side portions of said bracket extend perpendicularly rearwardly from said pair of vertically-oriented short sides of said flat, vertically-oriented, and rectangular-shaped lower portion of said flat, vertically-oriented front portion of said bracket, to a distance less than that of said obliquely-oriented and square-shaped top portion of said bracket, so that clearance is provided for said bracket from the rear cylinder of the engine of the motorcycle while allowing said cylindrically-shaped and externally-knurled adjustment knob to clear a rearmost push rod tube of the push rod tubes of the rear cylinder of the engine of the motorcycle for easy accessibility and rotation thereof; each side portion of said pair of flat, parallel, spaced-apart, vertically-oriented, and square-shaped side portions of said bracket has a center and a horizontally-oriented throughbore that extends horizontally through said center thereof.

30. The device as defined in claim 29, wherein said slender, horizontally-oriented, rigid, and cylindrically-shaped shaft extends rotatively through said horizontally-oriented throughbore in each side portion of said pair of flat, parallel, spaced-apart, vertically-oriented, and square-shaped side portions of said bracket to a distance slightly past each side portion of said pair of flat, parallel, spaced-apart, vertically-oriented, and square-shaped side portions of said bracket, and is parallel to said flat, vertically-oriented front portion of said bracket.

31. The device as defined in claim 29, wherein said cylindrically-shaped and externally-knurled adjustment knob abuts rotatively against, without extending past edges of, an outer surface of a rearmost side portion of said pair of flat, parallel, spaced-apart, vertically-oriented, and square-shaped side portions of said bracket.

32. The device as in claim 29; further comprising a snap ring encircling said distal end of said slender, horizontally-oriented, rigid, and cylindrically-shaped shaft and being disposed at said horizontally-oriented throughbore in a forwardmost side portion of said pair of flat, parallel, spaced-apart, vertically-oriented, and square-shaped side portions of said bracket, so that said slender, horizontally-oriented, rigid, and cylindrically-shaped shaft is maintained in place.

33. The device as defined in claim 27; further comprising a mounting screw that passes through said substantially vertically-oriented throughbore in said obliquely-oriented and square-shaped top portion of said bracket and into the existing hole in the obliquely-oriented bottom of the cylinder head of the rear cylinder of the engine of the motorcycle, with said flat and square-shaped outer surface of said obliquely-oriented and square-shaped top portion of said bracket abutting against the obliquely-oriented bottom of the cylinder head of the rear cylinder of the engine of the motorcycle, so that the oblique orientation of said obliquely-oriented and square-shaped top portion of said bracket relative to said flat, vertically-oriented front portion of said bracket allows said slender, horizontally-oriented, rigid, and cylindrically-shaped shaft to remain horizontal and thereby allowing said cylindrically-shaped and externally-knurled adjustment knob to be easily accessible for rotation thereof when said bracket is mounted to the obliquely-oriented bottom of the cylinder head of the rear cylinder of the engine of the motorcycle.

34. A method of adjusting a carburetor of a motorcycle, comprising the step of adjusting the carburetor of the motor cycle from a position remote from the carburetor of the motorcycle by a rider while the rider is riding the motor cycle by using a remote motorcycle idle adjustment control device that is attachable to the motorcycle and which comprises:

a) a bracket attachable to an engine of the motorcycle at a position remote from the carburetor of the motorcycle wherein the position is one of:

i) at an existing hole in, and in abutment against, a rear cylinder of the engine of the motorcycle and straddling and clearing cooling fins of the rear cylinder of the engine of the motorcycle and straddling and clearing a cable of an oil pressure gauge of the engine of the motorcycle and clearing an air cleaner assembly of the engine of the motorcycle and clearing push rod tubes of the engine of the motorcycle, so that said bracket conforms to the configuration of the engine of the motorcycle; and ii) at an existing hole in, and in abutment against, a bottom of an obliquely-oriented cylinder head of the rear cylinder of the engine of the motorcycle and nested between and clearing the push rod tubes of the rear cylinder of the engine of the motorcycle and clearing the engine air cleaner assembly of the engine of the motorcycle and clearing the rear cylinder of the engine of the motorcycle, so that said bracket conforms to the configuration of the engine of the motorcycle;

b) a slender, horizontally-oriented, rigid, and cylindrically-shaped shaft extending rotatively through said bracket and having a proximal end and a distal end;

c) a cylindrically-shaped and externally-knurled adjustment knob having a diameter and being attached to, for rotation with, said proximal end of said slender, horizontally-oriented, rigid, and cylindrically-shaped shaft;

d) an elongated, slender, and flexible cable having a length and being attached at a proximal end thereof collinearly to, and for rotation with, said distal end of said slender, horizontally-oriented, rigid, and cylindrically-shaped shaft and having a distal end, so that required bends to route said elongated, slender, and flexible cable to the carburetor of the motorcycle can be achieved; and e) a carburetor adjustment screw having a length, a head attached to, for rotation with, said distal end of said elongated, slender, and flexible cable, and a threaded portion extending collinearly with said distal end of said elongated, slender, and flexible cable and threadably engaging, for adjustment of, the carburetor of the motorcycle, so that when said cylindrically-shaped and externally-knurled adjustment knob is rotated by the rider from the position remote from the carburetor of the motorcycle while the rider is riding the motorcycle, said slender, horizontally-oriented, rigid, and cylindrically-shaped shaft is caused to rotate in said bracket which in turn causes said elongated, slender, and flexible cable to rotate which in turn causes said carburetor adjustment screw to rotate in said carburetor and adjust the carburetor of the motorcycle while the rider is riding the motorcycle allowing for a more accurate adjustment.

* * * * *